(12) United States Patent
DeWitt, Jr. et al.

(10) Patent No.: US 7,506,207 B2
(45) Date of Patent: *Mar. 17, 2009

(54) METHOD AND SYSTEM USING HARDWARE ASSISTANCE FOR CONTINUANCE OF TRAP MODE DURING OR AFTER INTERRUPTION SEQUENCES

(75) Inventors: Jimmie Earl DeWitt, Jr., Georgetown, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/942,432

(22) Filed: Nov. 19, 2007

(65) Prior Publication Data

US 2008/0104371 A1    May 1, 2008

Related U.S. Application Data (63) Continuation of application No. 10/045,513, filed on Jan. 14, 2002, now Pat. No. 7,350,110.

(51) Int. Cl.
*G06F 11/00* (2006.01)
(52) U.S. Cl. ............... 714/35; 714/34; 712/227; 712/244
(58) Field of Classification Search .......... 714/34, 714/35; 712/244, 233, 227
See application file for complete search history.

(56) References Cited

U.S. PATENT DOCUMENTS

| 5,621,886 A | 4/1997 | Alpert et al. |
|---|---|---|
| 5,659,679 A | 8/1997 | Alpert et al. |
| 5,715,440 A | 2/1998 | Ohmura et al. |

(Continued)

FOREIGN PATENT DOCUMENTS

JP    03105503 A    5/1991

(Continued)

OTHER PUBLICATIONS

AIX Version 4.3 Kernel and Subsystems Technical Reference, vol. 1, "Pinu Kernel Service", IBM Corp., 1997.

(Continued)

*Primary Examiner*—Joshua A Lohn
(74) *Attorney, Agent, or Firm*—Yee & Associates, P.C.; Matthew W. Baca (57) ABSTRACT

A method, system, apparatus, and computer program product is presented for processing instructions. A processor is able to receive multiple types of interruptions while executing instructions, such as aborts, faults, interrupts, and traps. A set of processor fields are used to indicate whether or not one or more trap modes are active, such as a single-step trap mode or a taken-branch trap mode. The activity of a trap mode is conditioned, i.e., restricted, modified, or qualified, with a trap mode conditioning field that indicates whether or not the trap mode should remain active during interruption processing. The use of a trap mode conditioning field allows an interruption handler to run at full speed without being interrupted by the trap mode, yet the trap mode is preserved so that other processing, such as instruction tracing, may continue after interruption processing.

14 Claims, 8 Drawing Sheets

| TRAP MODE CONDITIONING FIELD VALUES | |
|---|---|
| 0 0 0 | TRAP MODE NOT PRESERVED DURING OR AFTER INTERRUPTION |
| 0 0 1 | TRAP MODE RESTORED UPON EXECUTION OF RFI INSTRUCTION |
| 1 0 0 | TRAP MODE PRESERVED INTO INTERRUPTION HANDLER |
| 1 0 1 | TRAP MODE PRESERVED--TRAP MODE HANDLER ALLOWS INTERRUPTION HANDLER TO EXECUTE AT FULL SPEED--NO TRACE RECORD |
| 1 1 0 | TRAP MODE PRESERVED--TRAP MODE HANDLER ALLOWS INTERRUPTION HANDLER TO EXECUTE AT FULL SPEED--TRACE RECORD AT ENTRY |
| 1 1 1 | TRAP MODE PRESERVED--TRAP MODE HANDLER ALLOWS INTERRUPTION HANDLER TO EXECUTE AT FULL SPEED--TRACE RECORD AT EXIT |

U.S. PATENT DOCUMENTS

| | | | |
|---|---|---|---|
| 5,740,413 | A | 4/1998 | Alpert et al. |
| 5,938,778 | A | 8/1999 | John, Jr. et al. |
| 6,006,030 | A | 12/1999 | Dockser |
| 6,009,515 | A | 12/1999 | Steele, Jr. |
| 6,094,729 | A | 7/2000 | Mann |
| 6,173,395 | B1 | 1/2001 | Wisor et al. |
| 6,223,338 | B1 | 4/2001 | Smolders |

FOREIGN PATENT DOCUMENTS

| | | |
|---|---|---|
| JP | 04362745 A | 12/1992 |
| JP | 07013806 A | 1/1995 |
| JP | 11119992 A | 4/1999 |
| JP | 2000066923 A | 3/2000 |
| JP | 2000076095 A | 3/2000 |

OTHER PUBLICATIONS

Itanium Processor Microarchitecture Reference for Software Optimization, Intel Corp., Mar. 2000, pp. 1-28.

Intanium IA-64 Architecture Software Developer's Manual, vol. 4: Itanium Processor Programmer's Guide, Revision 1.1 Intel Corp., Jul. 2000, pp. 1-6 to 6-32.

Itanium IA-64 Architecture Software Developer's Manual, vol. 1: IA-64 Application Architecture, Revision 1.1, Intel Corp., Jul. 2000, pp. 1-2 to 2-8, 1-3 to 3-20, 1-4 to 4-35, 1-9 to 9-16, 1-10 to 10-16.

Itanium IA-64 Architecture Software Developer's Manual, vol. 2: IA-64 System Architecture, revision 1.1, Intel Corp., Jul. 2000, pp. 1-2 to 2-4, 1-3 to 3-22, 1-5 to 5-36, 1-7 to 7-14.

| TRAP MODE CONDITIONING FIELD VALUES | |
|---|---|
| 0 0 0 | TRAP MODE NOT PRESERVED DURING OR AFTER INTERRUPTION |
| 0 0 1 | TRAP MODE RESTORED UPON EXECUTION OF RFI INSTRUCTION |
| 1 0 0 | TRAP MODE PRESERVED INTO INTERRUPTION HANDLER |
| 1 0 1 | TRAP MODE PRESERVED--TRAP MODE HANDLER ALLOWS INTERRUPTION HANDLER TO EXECUTE AT FULL SPEED--NO TRACE RECORD |
| 1 1 0 | TRAP MODE PRESERVED--TRAP MODE HANDLER ALLOWS INTERRUPTION HANDLER TO EXECUTE AT FULL SPEED--TRACE RECORD AT ENTRY |
| 1 1 1 | TRAP MODE PRESERVED--TRAP MODE HANDLER ALLOWS INTERRUPTION HANDLER TO EXECUTE AT FULL SPEED--TRACE RECORD AT EXIT |

METHOD AND SYSTEM USING HARDWARE ASSISTANCE FOR CONTINUANCE OF TRAP MODE DURING OR AFTER INTERRUPTION SEQUENCES

This application is a continuation of application Ser. No. 10/045,513, filed Jan. 14, 2002, now U.S. Pat. No. 7,350,110 status allowed.

BACKGROUND OF THE INVENTION

1. Field of the Invention

The present invention relates generally to an improved data processing system and, in particular, to a method and system for instruction processing within a processor in a data processing system.

2. Description of Related Art

In analyzing the performance of a data processing system and/or the applications executing within the data processing system, it is helpful to understand the execution flows and the use of system resources. Performance tools are used to monitor and examine a data processing system to determine resource consumption as various software applications are executing within the data processing system. For example, a performance tool may identify the most frequently executed modules and instructions in a data processing system, or it may identify those modules which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. For example, a trace tool may log every entry into, and every exit from, a module, subroutine, method, function, or system component. Alternately, a trace tool may log the amounts of memory allocated for each memory allocation request and the identity of the requesting thread. Typically, a time-stamped record is produced for each such event. Corresponding pairs of records similar to entry-exit records also are used to trace execution of arbitrary code segments, starting and completing I/O or data transmission, and for many other events of interest.

In order to improve software performance, it is often necessary to determine where time is being spent by the processor in executing code, such efforts being commonly known in the computer processing arts as locating "hot spots." Within these hot spots, there may be lines of code that are frequently executed. When there is a point in the code where one of two or more branches may be taken, it is useful to know which branch is the mainline path, or the branch most frequently taken, and which branch or branches are the exception branches. Grouping the instructions in the mainline branches of the module closely together also increases the likelihood of cache hits because the mainline code is the code that will most likely be loaded into the instruction cache.

Ideally, one would like to isolate such hot spots at the instruction level and/or source line level in order to focus attention on areas which might benefit most from improvements to the code. For example, isolating such hot spots to the instruction level permits a compiler developer to find significant areas of suboptimal code generation. Another potential use of instruction level detail is to provide guidance to CPU developers in order to find characteristic instruction sequences that should be optimized on a given type of processor.

Another analytical methodology is instruction tracing by which an attempt is made to log every executed instruction. Instruction tracing is an important analytical tool for discovering the lowest level of behavior of a portion of software.

However, implementing an instruction tracing methodology is a difficult task to perform reliably because the tracing program itself causes some interrupts to occur. If the tracing program is monitoring interrupts and generating trace output records for those interrupts, then the tracing program may log interrupts that it has caused through its own operations. In that case, it would be more difficult for a system analyst to interpret the trace output during a post-processing phase because the information for the interrupts caused by the tracing program must first be recognized and then must be filtered or ignored when recognized.

More specifically, instruction tracing may cause interrupts while trying to record trace information because the act of accessing an instruction may cause interrupts, thereby causing unwanted effects at the time of the interrupt and generating unwanted trace output information. A prior art instruction tracing technique records information about the next instruction that is about to be executed. In order to merely log the instruction before it is executed, several interrupts can be generated with older processor architectures, such as the X86 family, while simply trying to access the instruction before it is executed. For example, an instruction cache miss may be generated because the instruction has not yet been fetched into the instruction cache, and if the instruction straddles a cache line boundary, another instruction cache miss would be generated. Similarly, there could be one or two data cache misses for the instruction's operands, each of which could also trigger a page fault.

Other problems can arise relating to execution flow. For example, to prevent interrupts from disrupting its processing, a portion of the tracing software usually disables interrupts during its operations and then enables them when it has completed its operations. Any trace records associated with processing interrupts that were asserted during that period would be temporally skewed.

One of the more difficult problems to handle with respect to instruction tracing is the fact that known processors do not preserve a previously enabled single-step mode or taken-branch mode when an interrupt is taken. However, these modes need to be preserved so that the integrity of the trace output can be maintained. In order to preserve these modes, the interrupt-handling code is usually modified in some manner to re-enable them, and this special version of the interrupt-handling code is executed when the tracing software is executed, thereby increasing software maintenance requirements and also proliferating potential sources of coding errors.

Therefore, it would be advantageous to have hardware structures within the processor that assist tracing operations by preserving a single-step mode or a taken-branch mode during interruption processing.

SUMMARY OF THE INVENTION

A method, system, apparatus, and computer program product is presented for processing instructions. A processor is able to receive multiple types of interruptions while executing instructions, such as aborts, faults, interrupts, and traps. A set of processor fields are used to indicate whether or not one or more trap modes are active, such as a single-step trap mode or a taken-branch trap mode. The activity of a trap mode is conditioned, i.e., restricted, modified, or qualified, with a trap mode conditioning field that indicates whether or not the trap mode should remain active during interruption processing. The use of a trap mode conditioning field allows an interruption handler to run at full speed without being interrupted by the trap mode, yet the trap mode is preserved so that other processing, such as instruction tracing, may continue after interruption processing.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is directed to hardware structures within a processor that assist tracing operations. As background, a typical organization of hardware and software components within a data processing system is described prior to describing the present invention in more detail.

Figure 1A:
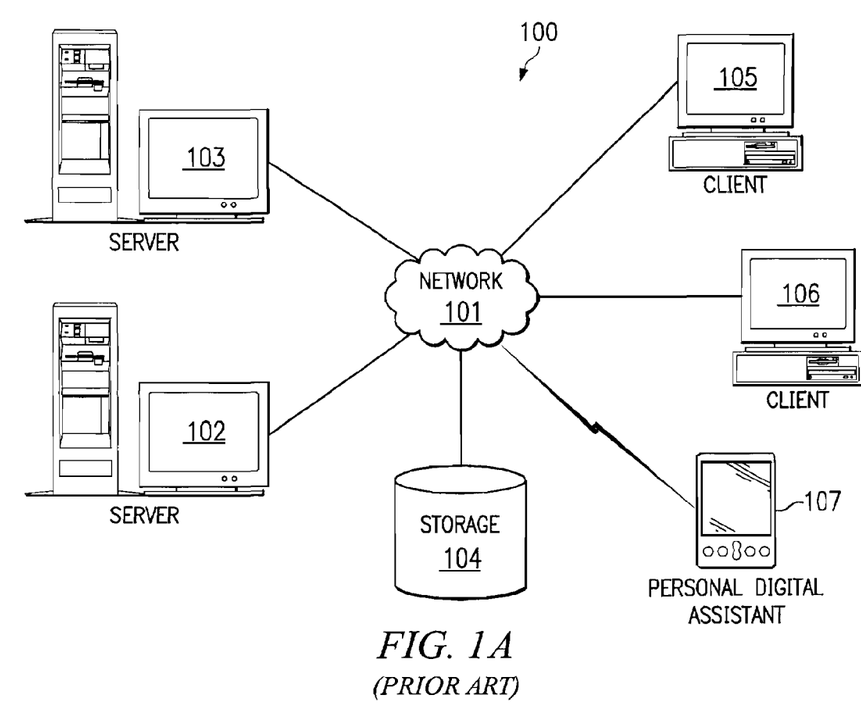
FIG. 1A depicts a typical data processing system in which the present invention may be implemented.

With reference now to the figures, FIG. 1A depicts a typical data processing system in which the present invention may be implemented. Data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 may be a variety of computing devices, such as personal computers, personal digital assistants (PDAs), etc. Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN).

FIG. 1A is intended as an example of a heterogeneous computing environment and not as an architectural limitation for the present invention. The present invention could be implemented on a variety of hardware platforms, such as server 102 or client 107 shown in FIG. 1A. Requests for the collection of performance information may be initiated on a first device within the network, while a second device within the network receives the request, collects the performance information for applications executing on the second device, and returns the collected data to the first device.

Figure 1B:
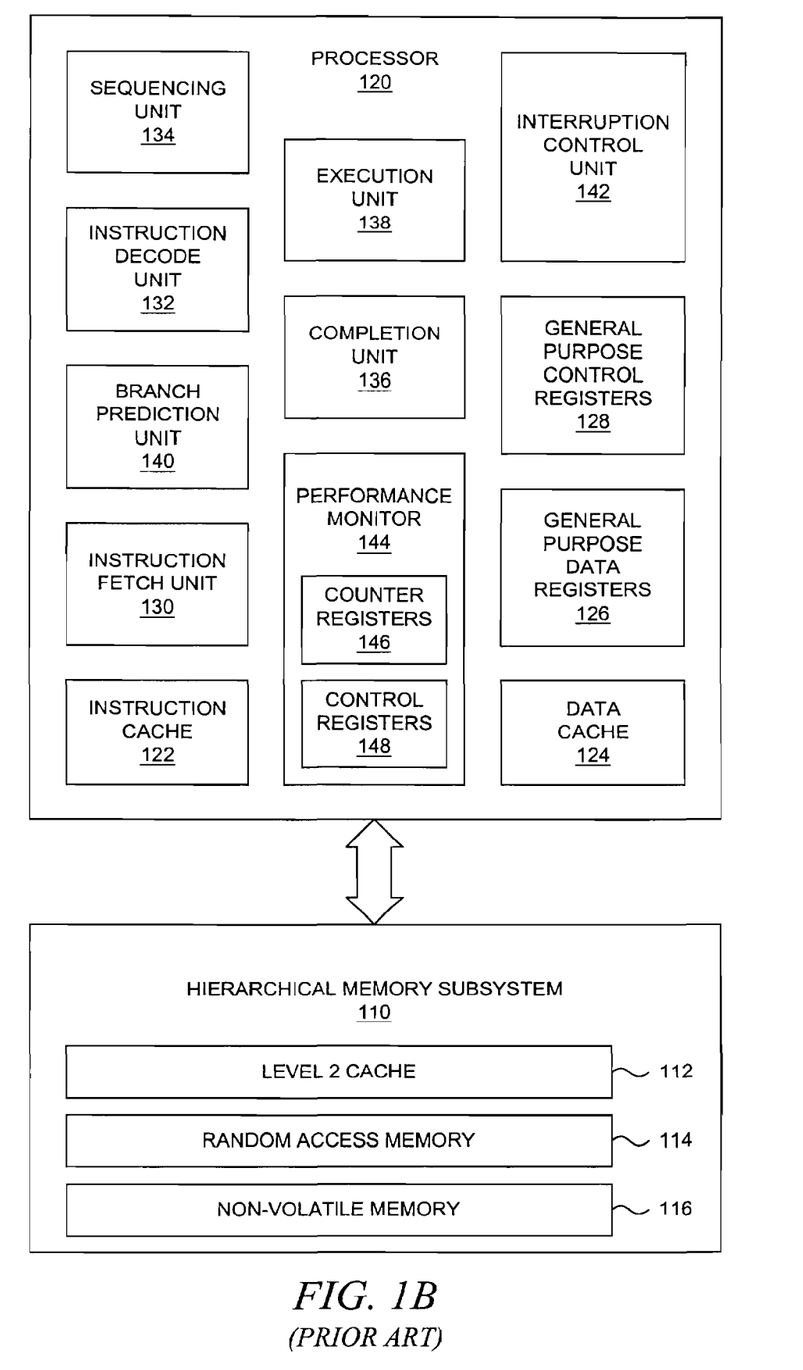
FIG. 1B depicts typical structures in a processor and a memory subsystem in which the present invention may be implemented.

With reference now to FIG. 1B, a block diagram depicts typical structures in a processor and a memory subsystem that may be used within a client or server, such as those shown in FIG. 1A, in which the present invention may be implemented. Hierarchical memory 110 comprises Level 2 cache 112, random access memory (RAM) 114, and non-volatile memory 116. Level 2 cache 112 provides a fast access cache to data and instructions that may be stored in RAM 114 in a manner which is well-known in the art. RAM 114 provides main memory storage for data and instructions that may also provide a cache for data and instructions stored in nonvolatile memory 116, such as a flash memory or a disk drive.

Processor 120 comprises a pipelined processor capable of executing multiple instructions in a single cycle. During operation of the data processing system, instructions and data are stored in hierarchical memory 110. Data and instructions may be transferred to processor 120 from hierarchical memory 110 on a common data path/bus or on independent data paths/buses. In either case, processor 120 may provide separate instruction and data transfer paths within processor 120 in conjunction with instruction cache 122 and data cache 124. Instruction cache 122 contains instructions that have been cached for execution within the processor. Some instructions may transfer data to or from hierarchical memory 110 via data cache 124. Other instructions may operate on data that has already been loaded into general purpose data registers 126, while other instructions may perform a control operation with respect to general purpose control registers 128.

Fetch unit 130 retrieves instructions from instruction cache 122 as necessary, which in turn retrieves instructions from memory 110 as necessary. Decode unit 132 decodes instructions to determine basic information about the instruction, such as instruction type, source registers, and destination registers.

In this example, processor 120 is depicted as an out-of-order execution processor. Sequencing unit 134 uses the decoded information to schedule instructions for execution. In order to track instructions, completion unit 136 may have data and control structures for storing and retrieving information about scheduled instructions. As the instructions are executed by execution unit 138, information concerning the executing and executed instructions is collected by completion unit 136. Execution unit 138 may use multiple execution subunits. As instructions complete, completion unit 136 commits the results of the execution of the instructions; the destination registers of the instructions are made available for use by subsequent instructions, or the values in the destination registers are indicated as valid through the use of various control flags. Subsequent instructions may be issued to the appropriate execution subunit as soon as its source data is available.

In this example, processor 120 is also depicted as a speculative execution processor. Generally, instructions are fetched and completed sequentially until a branch-type instruction alters the instruction flow, either conditionally or unconditionally. After decode unit 132 recognizes a conditional branch operation, sequencing unit 134 may recognize that the data upon which the condition is based is not yet available; e.g., the instruction that will produce the necessary data has not been executed. In this case, fetch unit 130 may use one or more branch prediction mechanisms in branch prediction unit 140 to predict the outcome of the condition. Control is then speculatively altered until the results of the condition can be determined. Depending on the capabilities of the processor, multiple prediction paths may be followed, and unnecessary branches are flushed from the execution pipeline.

Since speculative instructions can not complete until the branch condition is resolved, many high performance out-of-order processors provide a mechanism to map physical registers to virtual registers. The result of execution is written to the virtual register when the instruction has finished executing. Physical registers are not updated until an instruction actually completes. Any instructions dependent upon the results of a previous instruction may begin execution as soon as the virtual register is written. In this way, a long stream of speculative instructions can be executed before determining the outcome of a conditional branch.

Interruption control unit 142 controls events that occur during instruction processing that cause execution flow control to be passed to an interruption handling routine. A certain amount of the processor's state at the time of the interruption is saved automatically by the processor. After completion of interruption processing, a special return-from-interruption instruction (so-called "RFI" in the Intel® IA-64 architecture; other processor architectures may return to this type of instruction as an "interrupt-return" or "IRET") can be executed to restore the saved processor state, at which time the processor can proceed with the execution of the interrupted instruction. Interruption control unit 142 may comprise various data registers and control registers that assist the processing of an interruption.

Certain events occur within the processor as instructions are executed, such as cache accesses or Translation Lookaside Buffer (TLB) misses. Performance monitor 144 monitors those events and accumulates counts of events that occur as the result of processing instructions. Performance monitor 144 is a software-accessible mechanism intended to provide information concerning instruction execution and data storage; its counter registers and control registers can be read or written under software control via special instructions for that purpose. Performance monitor 144 contains a plurality of performance monitor counters (PMCs) or counter registers 146 that count events under the control of one or more control registers 148. The control registers are typically partitioned into bit fields that allow for event/signal selection and accumulation. Selection of an allowable combination of events causes the counters to operate concurrently; the performance monitor may be used as a mechanism to monitor the performance of the stages of the instruction pipeline.

Figure 1C:
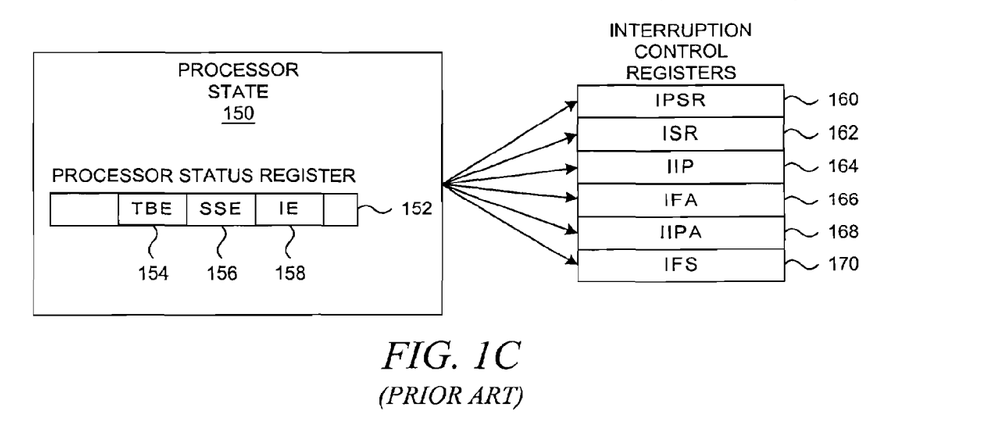
FIG. 1C depicts data structures within a processor that are used during a typical response to an interrupt.

With reference now to FIG. 1C, a block diagram depicts data structures within a processor that are used during a typical response to an interruption. At any given point in time, the processor can be described by its processor state 150, which is the value of the processor's registers, caches, and other data structures and signals. In some processors, registers are categorized as application-level registers and system-level registers. Processor status register (PSR) 152 is a system-level register that contains many of the important values for describing the processor state; only a few flags or fields within PSR 152 are shown in the example. A field within a processor register may comprise one or more bits that are set and/or cleared as necessary to indicate a mode, a condition, or some other type of operational state within the processor; the term "flag" is typically used to describe a one-bit field. PSR 152 may be considered to be similar to one of the general purpose control registers that are shown in FIG. 1B.

PSR 152 contains taken-branch-enable (TBE) flag 154 that causes a taken-branch trap to occur when a branch-type instruction is successfully completed. PSR 152 also contains single-step-enable (SSE) flag 156 that causes a single-step trap to occur following a successful execution of an instruction. Interrupt-enable (IE) flag 158 indicates whether interrupts will be fielded, i.e., whether external interrupts will cause the processor to transfer control to an external interruption handler.

When an interruption or a trap occurs, such as a taken-branch trap or a single-step trap, a portion of the current state of the processor is saved. After interruption processing, the saved processor state can be restored so that the interrupted execution flow may resume. In this example, values are saved and/or generated and stored into a set of interruption control registers, which may be considered to be similar to a subset of the general purpose control registers that are shown in FIG. 1B or which may be special registers within interruption control unit 142. Interruption processor status register (IPSR) 160 receives the value of PSR 152. Interruption status register (ISR) 162 receives information related to the nature of the interruption; multiple interrupts, including nested interrupts, may occur concurrently, and these may be reflected in the status bits within ISR 162. Interruption instruction pointer (IIP) register 164 receives the value of the instruction pointer; for traps and interrupts, IIP 164 may point to the next instruction, whereas IIP 164 may point to the faulting instruction for various types of fault conditions. Interruption faulting address (IFA) register 166 receives the address that raised the fault condition. Interruption instruction previous address (IIPA) register 168 records the address of the most recently executed instruction, i.e., the last successfully executed instruction. Interruption fault state (IFS) register 170 is used to reload the current register stack frame on a return-from-interruption. Other registers may be saved and/or loaded with values as required by a particular processor's architecture.

Those of ordinary skill in the art will appreciate that the hardware shown in FIG. 1B and FIG. 1C may vary depending on the system implementation. The depicted example is not meant to imply architectural limitations with respect to the present invention.

Figure 1D:
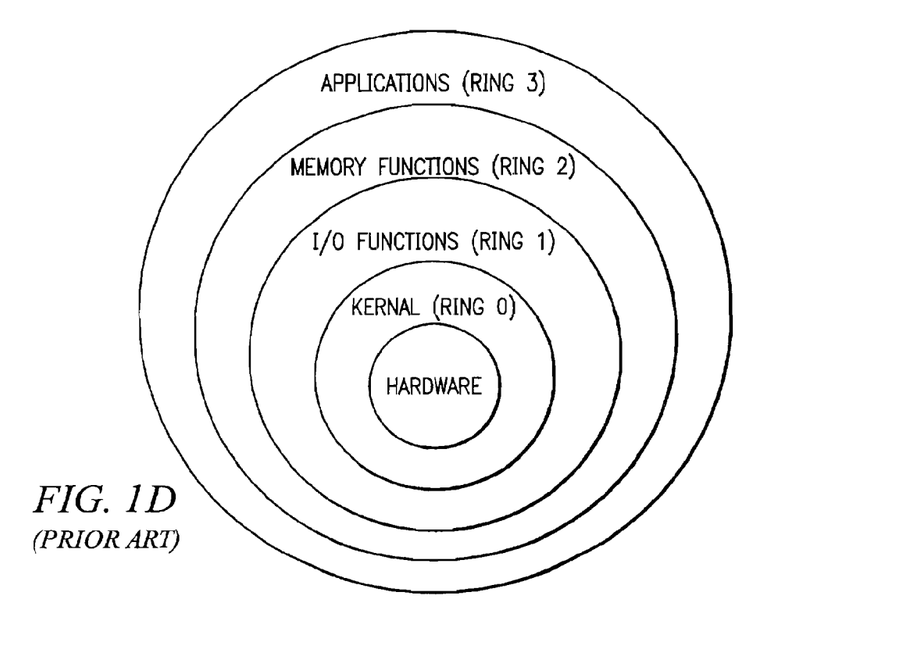
FIG. 1D depicts typical software components within a computer system illustrating a logical relationship between the components as functional layers of software.

With reference now to FIG. 1D, a prior art diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0-2, as a whole, may be viewed as the operating system of a particular device. Assuming that the operating system is extensible, software drivers may be added to the operating system to support various additional functions required by user applications, such as device drivers for support of new devices added to the system.

In addition to being able to be implemented on a variety of hardware platforms, the present invention may be implemented in a variety of software environments. A typical operating system may be used to control program execution within each data processing system. For example, one device may run a Linux® operating system, while another device may run an AIX® operating system.

Figure 1E:
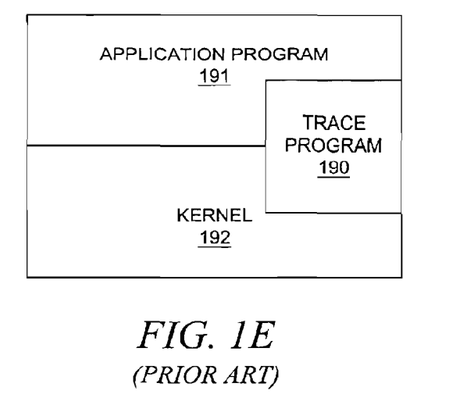
FIG. 1E depicts a typical relationship between software components in a data processing system that is being analyzed in some manner by a trace facility.

With reference now to FIG. 1E, a simple block diagram depicts a typical relationship between software components in a data processing system that is being analyzed in some manner by a trace facility. Trace program 190 is used to analyze application program 191 Trace program 190 may be configured to handle a subset of interrupts on the data processing system that is being analyzed. When an interruption or trap occurs, e.g., a single-step trap or a taken-branch trap, functionality within trace program 190 can perform various tracing functions, profiling functions, or debugging functions; hereinafter, the terms tracing, profiling, and debugging are used interchangeably. In addition, trace program 190 may be used to record data upon the execution of a hook, which is a specialized piece of code at a specific location in an application process. Trace hooks are typically inserted for the purpose of debugging, performance analysis, or enhancing functionality. Typically, trace program 190 generates trace data of various types of information, which is stored in a trace data buffer and subsequently written to a data file for post-processing.

Both trace program 190 and application program 191 use kernel 192, which comprises and/or supports system-level calls, utilities, and device drivers. Depending on the implementation, trace program 190 may have some modules that run at an application-level priority and other modules that run at a trusted, system-level priority with various system-level privileges.

It should be noted that the instruction tracing functionality of the present invention may be placed in a variety of contexts, including a kernel, a kernel driver, an operating system module, or a tracing process or program. Hereinafter, the term "tracing program" or "tracing software" is used to simplify the distinction versus typical kernel functionality and the processes generated by an application program. In other words, the executable code of the tracing program may be placed into various types of processes, including interruption handlers.

In addition, it should be noted that hereinafter the term "current instruction address" or "next instruction" refers to an instruction within an application that is being profiled/traced and does not refer to the next instruction within the profiling/tracing program. It is assumed that the processor and/or operating system has saved the instruction pointer that was being used during the execution of the application program in order to initiate an interruption handler; the instruction pointer would be saved into a special register or stack frame, and this saved value is retrievable by the tracing program. Hence, unless specifically stated otherwise, when the value of the instruction pointer is discussed, one refers to the value of the instruction pointer for the application program at the point in time at which the application program was interrupted.

Figure 1F:
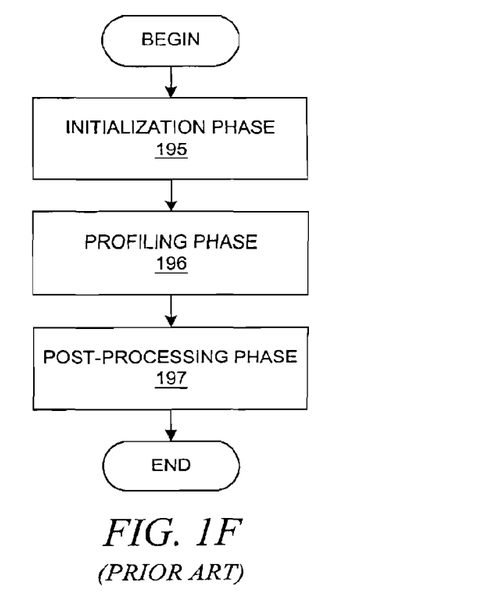
FIG. 1F depicts typical phases that may be used to characterize the operation of a tracing facility.

With reference now to FIG. 1F, a diagram depicts typical phases that may be used to characterize the operation of a tracing facility. An initialization phase 195 is used to capture the state of the client machine at the time tracing is initiated. This trace initialization data may include trace records that identify all existing threads, all loaded classes, and all methods for the loaded classes; subsequently generated trace data may indicate thread switches, interrupts, and loading and unloading of classes and jitted methods. A special record may be written to indicate within the trace output when all of the startup information has been written.

Next, during the profiling phase 196, trace records are written to a trace buffer or file. Subject to memory constraints, the generated trace output may be as long and as detailed as an analyst requires for the purpose of profiling or debugging a particular program.

In the post-processing phase 197, the data collected in the buffer is sent to a file for post-processing. During post-processing phase 197, each trace record is processed in accordance with the type of information within the trace record. After all of the trace records are processed, the information is typically formatted for output in the form of a report. The trace output may be sent to a server, which analyzes the trace output from processes on a client. Of course, depending on available resources or other considerations, the post-processing also may be performed on the client. Alternatively, trace information may be processed on-the-fly so that trace data structures are maintained during the profiling phase.

As mentioned previously, instruction tracing is an important analysis tool, but instruction tracing is difficult to perform reliably, particularly in conjunction with interruption processing because interrupts may be asserted while tracing software is executing. In some cases, a system analyst may want to allow interruptions to be processed as quickly as possible because the analyst is not concerned with capturing any trace information related to the processing of an interruption. In other cases, a system analyst may want to continue tracing instructions, including tracing the instructions that are executed within an interruption handler. At any given time, execution control resides within the application software, the instruction tracing software, the software for the interruption handler, or the software for a trap handler. The various combinations of events and the ability to trace instructions through the occurrence of those events can cause contention between an interruption handler and a trap handler that is being used by the instruction tracing software.

To prevent interruptions from disrupting its processing, a portion of the instruction tracing software typically disables interruptions during its execution and then enables interruptions when the tracing software has completed its operations. Typically, interruptions are held pending while disabled. If trace records are generated during interruption processing, then any trace records that are generated while processing previously suspended interruptions would be temporally skewed with respect to the time at which the interruptions were asserted.

One of the more difficult problems to handle with respect to instruction tracing is the fact that known processors do not preserve a previously enabled single-step trap mode or taken-branch trap mode when an interruption is taken. However, these modes need to be preserved so that the integrity of the trace output can be maintained. In order to preserve these modes, the interruption-handling code is usually modified in some manner to re-enable them. A special version of an interruption handler is created and deployed with the kernel, and this special version of the interruption handler is executed when the tracing software is executed. This creates a situation in which a system analyst must ensure that the appropriate interruption handler is installed during instruction tracing operations, thereby increasing software maintenance requirements and also proliferating potential sources of coding errors.

Hence, it would be advantageous to provide hardware assistance within a processor to assist in tracing operations within the system that is being analyzed. The present invention is described in more detail further below with respect to the remaining figures.

Figure 2A:
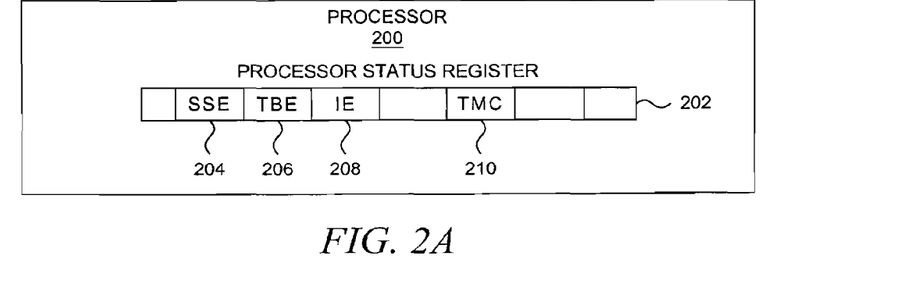
FIG. 2A depicts a processor for conditioning a trap mode during and/or after an interruption sequence in accordance with the present invention.

With reference now to FIG. 2A, a block diagram depicts a processor for conditioning a trap mode during and/or after an interruption sequence in accordance with the present invention. As shown in FIG. 1C, when an interruption occurs, a processor can save various informational values into a special set of interruption control registers; those informational values may include values from a different subset of registers within the processor. Any information that is necessary for restoring the processor's state after the interruption has been processed may be stored and retrieved. However, as mentioned above, known processors do not preserve a previously enabled single-step trap mode or taken-branch trap mode when an interruption is taken.

In contrast to FIG. 1C, FIG. 2A shows processor 200 that comprises structures and functionality for assisting in the conditioning of a trap mode during and/or after an interruption sequence. Processor status register (PSR) 202 is a system-level register that contains many of the important values for describing and controlling the processor state. PSR 202 is similar to PSR 152 that is shown in FIG. 1C, and only a few of the flags that may exist within PSR 202 are shown in the example. PSR 202 contains single-step-enable (SSE) flag 204 that causes a single-step trap to occur following a successful execution of an instruction. PSR 202 also contains taken-branch-enable (TBE) flag 206 that causes a taken-branch trap to occur when a branch-type instruction is successfully completed. Interrupt-enable (IE) flag 208 indicates whether interrupts will be fielded, i.e., whether external interrupts will cause the processor to transfer control to an external interruption handler.

When considered together, the SSE flag and the TBE flag indicate that at least one trap mode is active. Hereinafter, these conditions may be referred to generically as a trap mode for which a trap handler is invoked, although it should be noted that separate handlers may be used such that a single-step trap handler is invoked when necessary for processing a single-step trap and a taken-branch trap handler is invoked when necessary for processing a taken-branch trap.

In contrast to PSR 152 in FIG. 1C, PSR 202 also contains trap mode conditioning (TMC) field or flag 210, which may be set by software to condition the operation of the single-step trap mode and the taken-branch trap mode during and/or after an interruption sequence. For example, the use of TMC field or flag 210 allows an interruption handler to run at full speed without being interrupted by a single-step trap mode or a taken-branch trap mode, yet the single-step trap mode or the taken-branch trap mode are preserved so that other processing, such as instruction tracing of an application program, may subsequently continue, and there is no additional software-level interference to ensure the preservation of these modes. If there are multiple processing modes with respect to the trap mode conditioning operations, then the processor may contain a multi-bit TMC field; if there is a single processing option, then the processor may contain a single-bit TMC flag. The manner in which a single-bit TMC flag may be used is explained in more detail with respect to FIG. 2B and FIG. 2C, while the use of a multi-bit TMC field is explained with respect to the table of trap mode conditioning values shown in FIG. 2D and the flowcharts that are shown in the remaining figures.

Figure 2B:
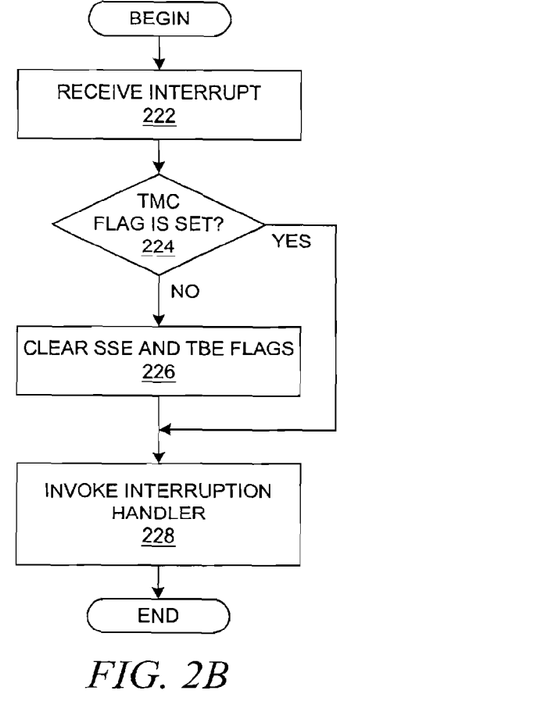
FIGS. 2B-2C are a set of flowcharts that depict a series of steps that may occur within a processor with respect to the trap mode conditioning (TMC) flag when an interruption is received but before invoking an interruption handler to process the interruption.
Figure 2C:
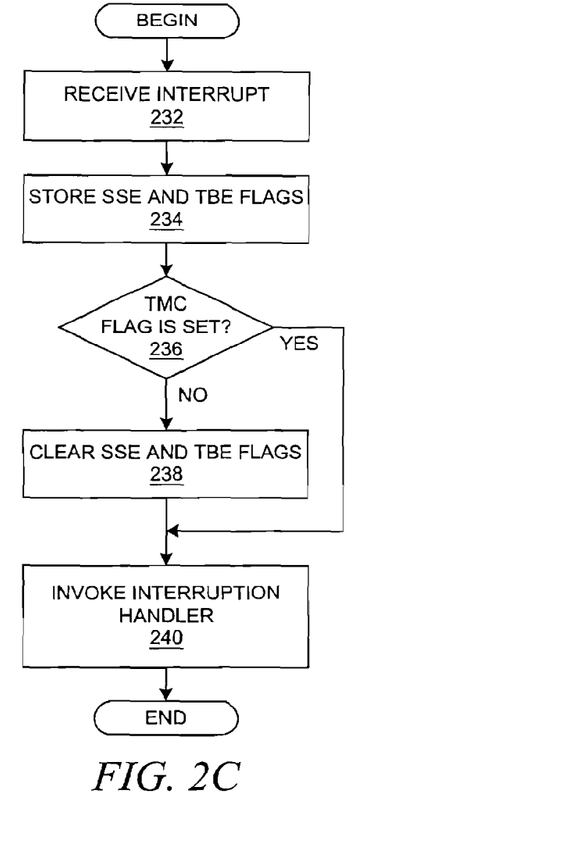

With reference now to FIGS. 2B-2C, a set of flowcharts depicts a series of steps that may occur within a processor with respect to the trap mode conditioning (TMC) flag when an interruption is received but before invoking an interruption handler to process the interruption. In the prior art, the SSE and TBE flags would be automatically cleared prior to invoking an interruption handler. In the present invention, prior to invoking an interruption handler, the processor performs actions on the SSE and TBE flags in relation to the requested conditioning of the trap mode via the TMC flag or field.

Referring to FIG. 2B, when an interrupt is received (step 222), a determination is made as to whether the TMC flag is set (step 224). If not, then the SSE and TBE flags are cleared (step 226) prior to invoking the interruption handler (step 228). If the TMC flag is set, then the interruption handler is invoked without clearing the SSE and TBE flags. In this manner, the TMC flag controls whether or not a trap mode is continued when the interruption handler is invoked. In contrast to the prior art in which the trap mode is always cleared when an interruption occurs, the present invention allows software control over whether or not the trap mode is cleared when an interruption occurs.

Referring to FIG. 2c, when an interruption is received (step 232), the SSE and TBE flags are automatically saved (step 234), e.g., into an interruption control register or other register within the processor. A determination is then made as to whether the TMC flag is set (step 236). If not, then the SSE and TBE flags are cleared (step 228) prior to invoking the interruption handler (step 240). If the TMC flag is set, then the interruption handler is invoked without clearing the SSE and TBE flags.

In a manner similar to that shown in FIG. 2B, FIG. 2C shows a process in which the TMC flag controls whether or not a trap mode is continued when the interruption handler is invoked. In contrast to FIG. 2B in which the trap mode is not restored if it is cleared, FIG. 2C shows a process in which the trap mode is saved for subsequent restoration after the interruption processing has been completed. As explained in more detail further below with respect to FIG. 3B, a trap mode can be restored after the interruption has been processed. In this particular embodiment, a trap mode is always saved when an interruption occurs, and the present invention allows software control over whether or not the trap mode is cleared during interruption processing.

The following embodiments are similar to the embodiments shown in FIG. 2B and FIG. 2C but expand on the possible processing modes that may be associated with a multi-bit trap mode conditioning field rather than a single-bit trap mode conditioning flag.

Figure 2D:
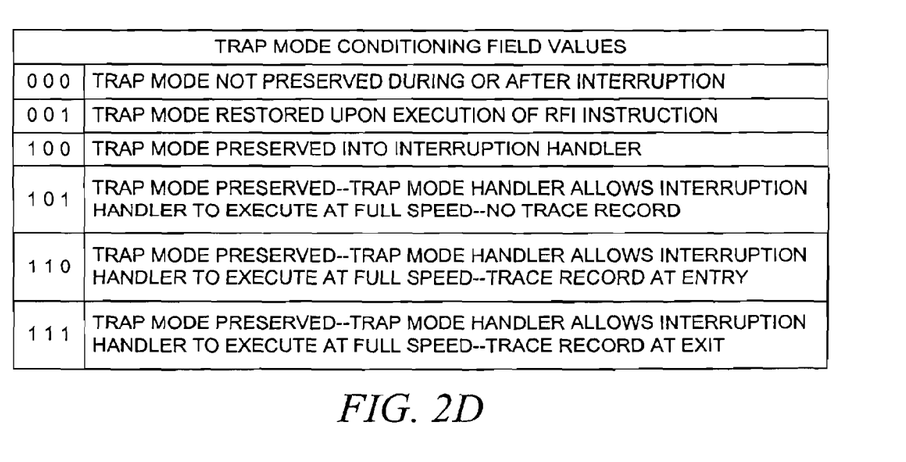
FIG. 2D depicts trap mode conditioning values that may be configured in the trap mode conditioning field of the processor status register to assert control over the available trap mode conditioning options.

With reference now to FIG. 2D, a table depicts trap mode conditioning values that may be configured in the multi-bit trap mode conditioning field of the processor status register to assert control over the available trap mode conditioning options. Assuming that interrupts are enabled, as would be indicated through the use of the IE flag, and assuming that at least one trap mode is enabled, as would be indicated through the use of the SSE or TBE flags, then a processor uses the trap mode conditioning field to determine the manner in which contention is resolved between trap mode processing and interruption processing. In the examples below, six different cases, i.e., processing options, are represented using three-bit values in the trap mode conditioning field, but the trap mode conditioning field could be expanded as necessary to allow for more conditioning options.

In the following examples, the first two trap mode conditioning cases are related in that a trap mode is either completely suspended or completely ended when an interruption occurs.

The remaining four trap mode conditioning cases are related in that a trap mode is preserved during interruption handling. After the processor invokes the trap handler, it is the responsibility of the trap handler to interpret the trap mode conditioning value as an indicator of the manner in which the trap handler should operate. The first of these trap mode conditioning cases continues the trap mode without regard to the interruption, while the other three trap mode conditioning cases continue the trap mode but give some deference to the processing needs of the interruption, as is explained in more detail below.

With the first trap mode conditioning case, i.e., binary value "000", a processor does not preserve the trap mode in any manner when an interruption occurs. This is similar to the prior art in which a processor automatically clears a trap mode flag when an interruption is fielded.

With the second trap mode conditioning case, i.e., binary value "001", the processor suspends the trap mode when an interruption occurs. The interruption handler executes at full speed without interference from a trap handler, and the trap mode is restored when the interruption handler has completed its processing, which is indicated with a special return-from-interruption (RFI) instruction that allows the processor to return to the processing state that existed just prior to the occurrence of the interruption.

With the third trap mode conditioning case, i.e., binary value "100", the processor preserves the trap mode when an interruption occurs. At that point, the processor hardware creates a processor state in which the trap mode is preserved, but it is the responsibility of the interruption handler to interpret the trap mode conditioning value for the manner in which it should execute vis-a-vis the interruption. In this case, a trap mode conditioning value of "100" instructs the trap handler to continue its trap mode operations during the execution of the interruption handler, thereby allowing instruction tracing (and possibly other operations) to occur during the execution of the interruption handler. For example, if the single-step trap mode is active when an interruption occurs, then the single-step trap handler is invoked upon the execution of the first instruction within the interruption handler. If the taken-branch trap mode is active when an interruption occurs, then the taken-branch trap handler is invoked upon the execution of a branch-type instruction within the interruption handler.

In this manner, the trap modes can be used to continue trap mode operations, such as instruction tracing, into the execution flow of an interruption handler. From a certain perspective, the processing for the trap mode dominates the processing for the interruption, thereby allowing an analyst to obtain as much instruction tracing information as possible without regard to interruptions. This third trap mode conditioning case can be considered a "heavyweight" use of the trap handler, whereas the fourth, fifth, and sixth cases exhibit a "light-weight" use of the trap handler.

With the fourth, fifth, and sixth trap mode conditioning cases, i.e., binary values "101", "110", and "111", the subsequent processing is similar. As described above with respect to binary value "100", the processor preserves the trap mode when an interruption occurs, and it is the responsibility of the interruption handler to interpret the trap mode conditioning value for the manner in which it should execute vis-a-vis the occurrence of an interruption. For these cases, the trap handler gives deference to the interruption handler by allowing the interruption hander to execute at full speed. In effect, the trap handler suspends itself, and the trap mode is resumed upon the execution of an RFI instruction.

The fourth, fifth, and sixth trap mode conditioning cases can be contrasted with the previously described third case in which the trap handler continued its operations as instructions were being executed within the interruption handler. Presumably, in the third case, the trap handler would be invoked repeatedly. In these cases, the trap handler is invoked at least once, but possibly only once, during the execution of the interruption handler, thereby allowing the trap handler to perform at least one operation if desired or necessary. In this manner, these cases can be considered as having a "light-weight" approach versus the third case's "heavyweight" approach.

From a certain perspective, these cases are similar to the second case because the trap mode is suspended and then resumed with the execution of an RFI instruction. On the other hand, whereas the trap handler is never invoked in the second case, these cases allow a system analyst to assert at least one invocation of the trap handler into the execution flow if desired or necessary.

The fourth, fifth, and sixth cases differ in the manner in which they support the indication of a tracing operation. With the fourth trap mode conditioning case, i.e., binary value "101", the trap handler immediately relinquishes execution control back to the interruption handler without performing any trace operations. In other words, the interruption processing is completed as fast as possible, and no trace records are generated to indicate that an interruption has occurred. This option might be useful to a system analyst who is tracing only application code and is not interested in tracing any operations within the kernel.

With the fifth trap mode conditioning case, i.e., binary value "110", the trap handler generates a trace record when it is first invoked after the interruption handler has been entered, thereby providing a trace record at the start of the exception processing for the interruption. With the sixth trap mode conditioning case, i.e., binary value "111", the trap handler generates a trace record when it is invoked after the interruption handler has completed its processing operations, e.g., after an RFI instruction is executed, thereby providing a trace record at the end of the exception processing for the interruption.

The different cases for conditioning the trap modes can be summarized in the following manner. In the first case, the processor terminates a trap mode when an interruption occurs, thereby allowing the interruption to be processed at full speed by the interruption handler. In the second case, the processor suspends a trap mode when an interruption occurs but resumes the trap mode when an RFI instruction is executed, thereby allowing the interruption to be processed at full speed by the interruption handler. In contrast to the first two cases in which the trap handler is never invoked, the third through sixth cases invoke the trap handler, and the trap handler determines the manner in which it is to continue processing. In the third through sixth cases, the processor preserves the trap mode when an interruption occurs, thereby causing the interruption to be processed at a relatively slow speed or in an interrupted manner because the interruption handler is itself interrupted by the execution of the trap handler. In the third case, the interruption is processed in possibly the slowest manner if the single-step trap mode is active as the interruption handler is executing. In the fourth through sixth cases, the trap handler determines for itself that it will allow the interruption handler to execute at full speed, thereby providing a certain amount of control to a system analyst over the operation of a trap handler and an interruption handler when both a trap mode is enabled and interruption processing is enabled.

Figure 3A:
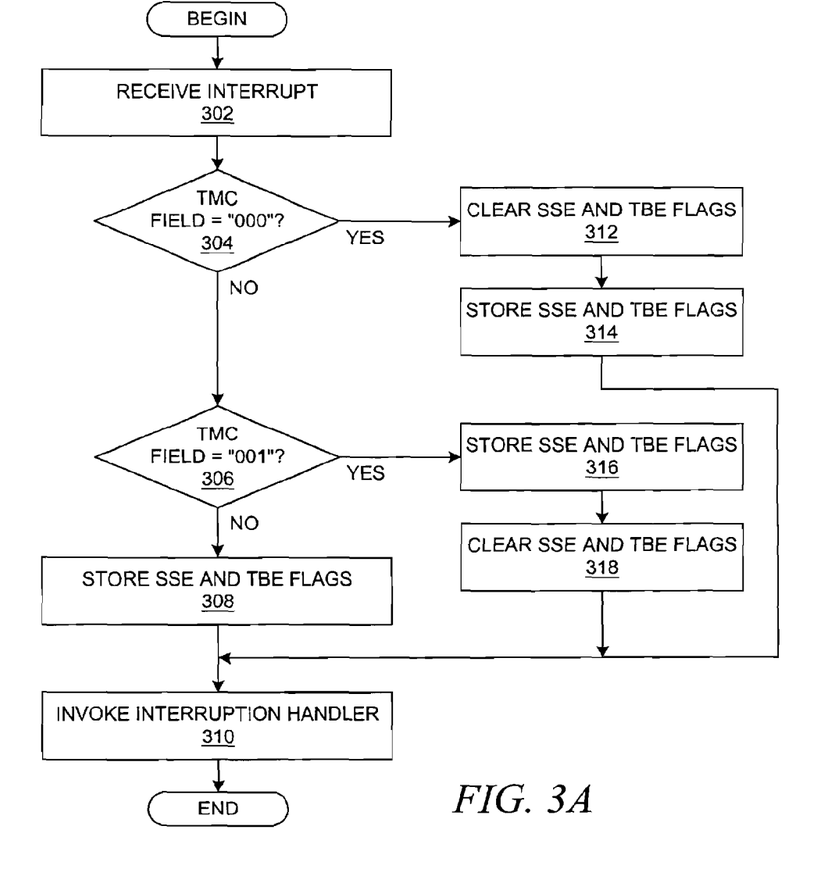
FIG. 3A is a flowchart that depicts a series of steps that may occur within a processor with respect to the trap mode conditioning (TMC) field when an interruption is received but before invoking an interruption handler to process the interruption.

With reference now to FIG. 3A, a flowchart depicts a series of steps that may occur within a processor with respect to the trap mode conditioning (TMC) field when an interruption is received but before invoking an interruption handler to process the interruption. Prior to invoking an interruption handler, some actions are performed by the processor on the SSE and TBE flags in relation to the conditioning of the trap mode that is requested via the TMC field. Primarily, the most important action is to save the proper values for the SSE and TBE flags such that they can be restored after the processing of the interruption is completed. Hence, the process that is depicted in FIG. 3A can be considered as being paired with the process in FIG. 3B, which depicts a process for restoring the single-step trap mode or the taken-branch trap mode after the interruption handler has finished its execution.

Although interruptions are discussed herein as either interrupt or traps, it may also be assumed that different types of interruptions may be recognized by the processor. However, it should be noted that the present invention is applicable to multiple categories of interruptions. For example, the Intel® IA-64 architecture categorizes interruptions into four types: aborts, interrupts, faults, and traps. An abort occurs when a processor has detected a machine-check condition, i.e., internal malfunction, or a processor reset. A fault occurs when an instruction has requested or requires an action which cannot or should not be carried out or which requires system intervention before the instruction can be executed. In general, an interrupt occurs when an external or independent entity requires attention, whereas a trap occurs when an instruction that has just executed requires system intervention.

Referring to FIG. 3A, the flowchart begins with the processor receiving an interruption signal (step 302). For exemplary purposes, it is assumed that interruptions are enabled via the IE flag in the processor status register. Hence, the flowchart does not show a test operation on the IE flag prior to proceeding. In addition, it is assumed that at least one trap mode is enabled, either the single-step trap mode via the SSE flag or the taken-branch trap mode via the TBE flag. Hence, the flowchart does not show test operations on the SSE or TBE flags prior to proceeding.

The processor determines whether or not the TMC field has a binary value of "000" (step 304). If not, then the processor determines whether or not the TMC field has a binary value of "001" (step 306). If not, then the processor stores the SSE and TBE flags in an appropriate location (step 308), such as the interruption control register or some other internal register. An appropriate interruption handler is determined, e.g., through an interruption vector table, and the interruption handler is then invoked for the received interruption (step 310), thereby completing the processing that is associated with initiating the processing of the interruption. It should be noted that some of the functionality within the processor may be performed in parallel.

If the TMC field is determined to have a binary value of "000" in step 304, then the SSE and TBE flags are cleared (step 310) prior to storing the flags in the interruption control register or some other internal register (step 312), after which the interruption handler is invoked. By clearing the trap mode flags prior to storing the flags, the flags are clear during the execution of the interruption handler, thereby allowing the interruption handler to execute without interference. In addition, the flags are clear when they are restored after the return-from-interruption, thereby terminating the trap mode. Hence, steps 312 and 314 represent the type of trap mode management that is found in prior art processors.

If the TMC field is determined to have a binary value of "001" in step 304, then the SSE and TBE flags are stored in the interruption control register or some other internal register (step 316) prior to clearing the flags (step 318), after which the interruption handler is invoked. By clearing the trap mode flags after storing the flags, the flags will be clear during the execution of the interruption handler, thereby allowing the interruption handler to execute without interference. In addition, the flags are restored after the return-from-interruption, thereby resuming a trap mode if a trap mode was present when the interruption was fielded.

Figure 3B:
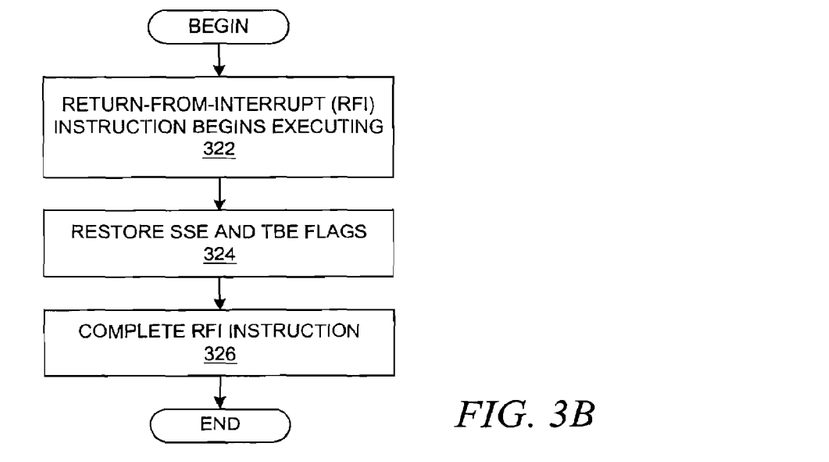
FIG. 3B is a flowchart that depicts a series of steps that may occur within a processor with respect to the SSE and TBE flags while a return-from-interruption (RFI) instruction is being processed after invoking an interruption handler to process an interruption.

With reference now to FIG. 3B, a flowchart depicts a series of steps that may occur within a processor with respect to the SSE and TBE flags while a return-from-interruption (RFI) instruction is being processed after invoking an interruption handler to process an interruption. As noted above, the process that is depicted in FIG. 3A can be considered as being paired with the process in FIG. 3B.

Referring to FIG. 3B, the flowchart begins with the processor initiating the execution of an RFI instruction (step 322). The processor restores the SSE and TBE flags from their temporary storage location, such as the interruption control register or some other internal register (step 324). The processor then completes any other processing that is required to complete the execution of the RFI instruction (step 326). As noted above, some of the functionality within the processor may be performed in parallel.

In the prior art, when an interruption is received, a processor always clears the flags associated with a single-step trap mode or a taken-branch trap mode so that the interruption handler could proceed freely without interruption from the single-step trap handler or the taken-branch trap handler. In the present invention, the operation of the flags associated with a single-step trap mode or a taken-branch trap mode are conditioned, i.e., restricted, modified, or qualified, with the TMC field that indicates whether or not to preserve the trap mode during interruption processing and/or indicates other operations to be performed with respect to interruption processing. It should be noted that the trap mode conditioning field could indicate alternative actions.

Figure 3C:
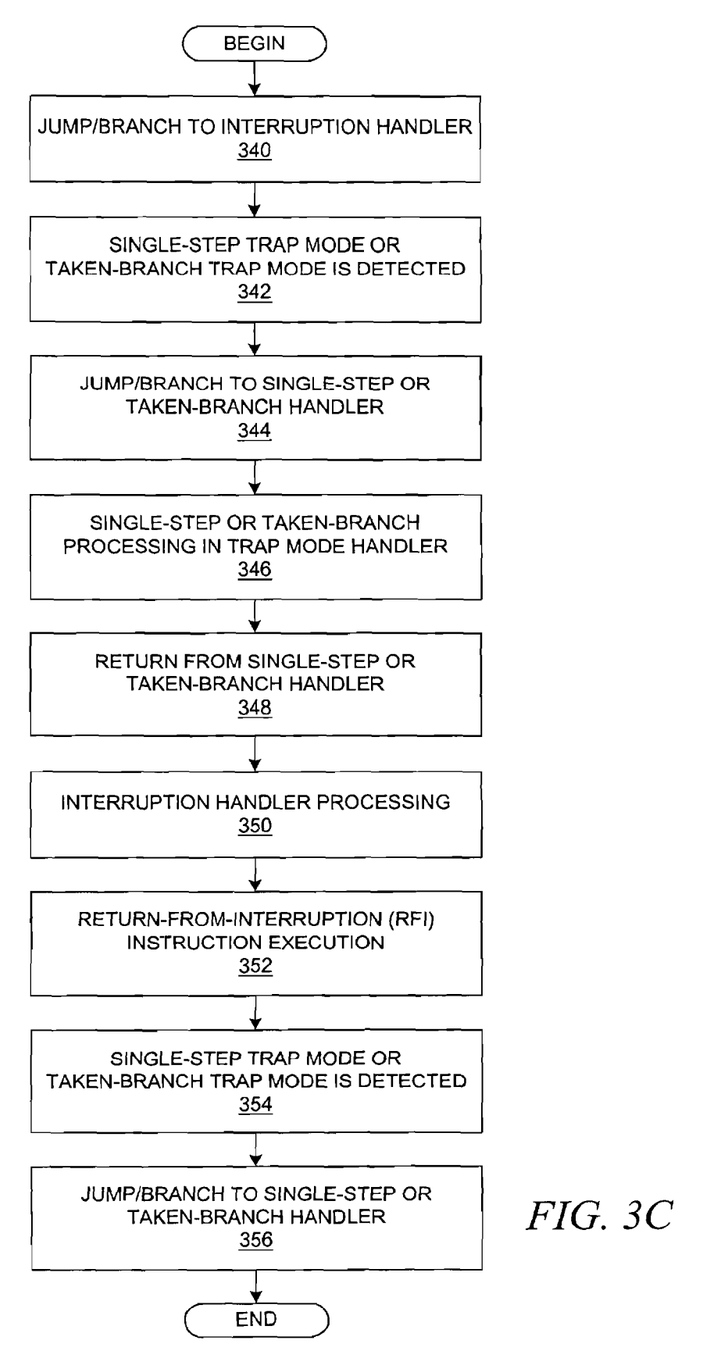
FIG. 3C is a timing diagram that depicts a series of steps that occur within hardware and software when there is contention between an interruption handler and a trap handler.
Figure 3D:
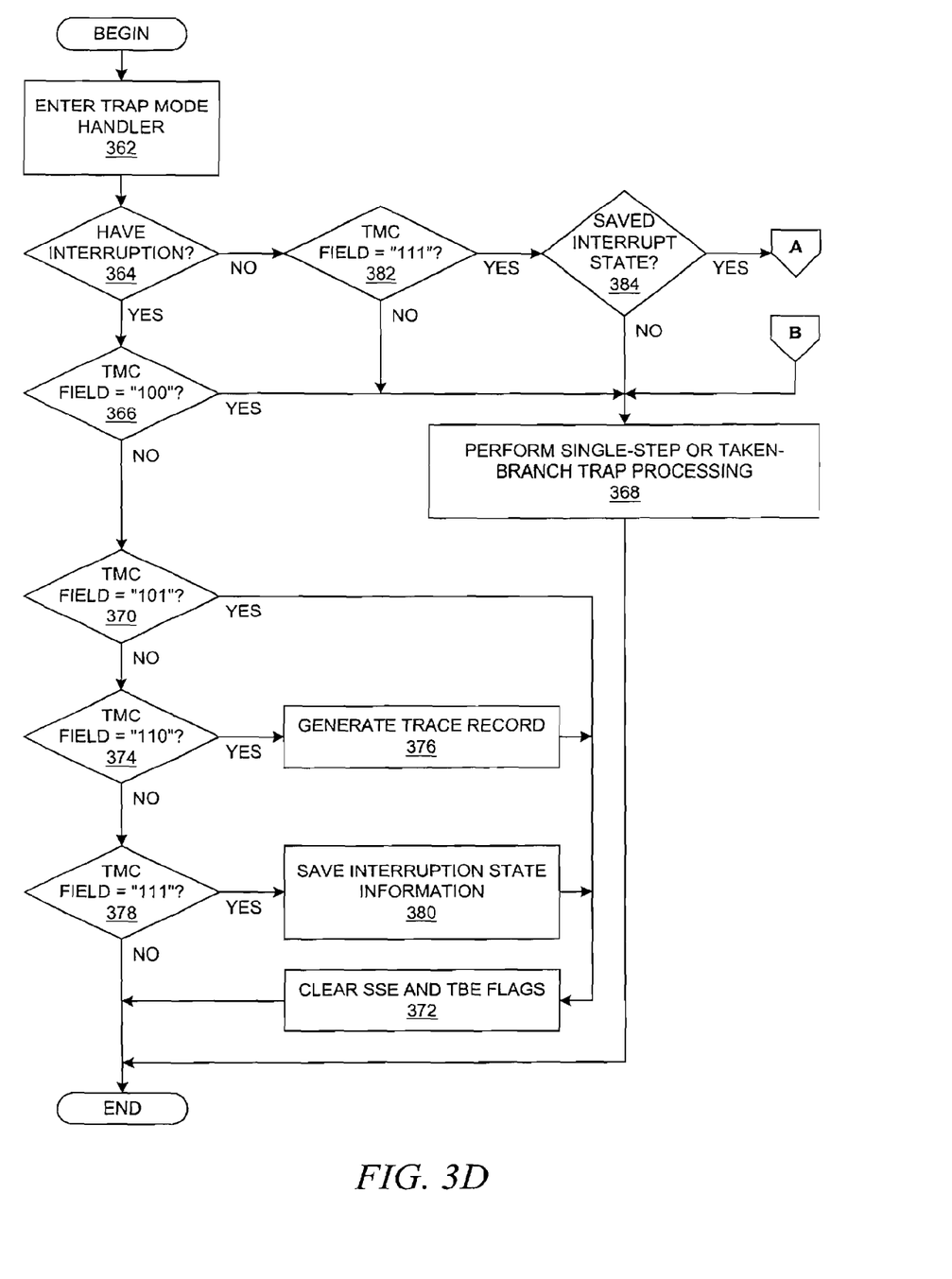
FIG. 3D is a flowchart that depicts a series of steps within a trap handler that alters its operational behavior in accordance with the values that are stored within a trap mode conditioning field in a processor register.
Figure 3E:
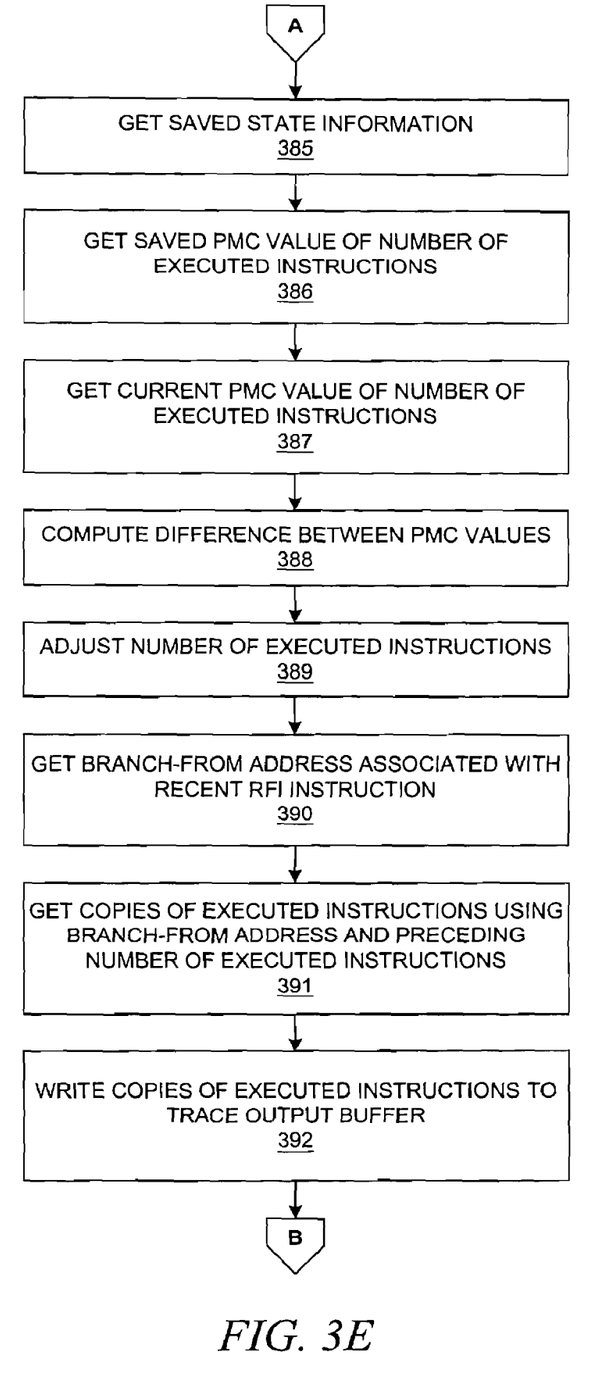
FIG. 3E is a flowchart that depicts a series of steps that are completed after the trap handler has determined that it is being invoked after an interruption state has been cleared and that it had saved interruption state information while the interruption state was active.

With reference now to FIG. 3C, a timing diagram depicts a series of steps that occur within hardware and software when there is contention between an interruption handler and a trap handler. The timing diagram of FIG. 3C explains the relationship between FIGS. 3A-3B and FIGS. 3D-3E. FIGS. 3A-3B depict some of the functionality within a processor at the hardware level with respect to the SSE flag, the TBE flag, and the TMC field, whereas FIGS. 3D-3E depict some of the functionality at the software level with respect to the SSE flag, the TBE flag, and the TMC field. The timing diagram of FIG. 3C consists of a mixture of steps that may occur at the hardware level and the software level. FIGS. 3D-3E illustrate a particular use of the SSE flag, the TBE flag, and the TMC field for enabling instruction tracing.

Referring to FIG. 3C, the process begins by jumping or branching to an interruption handler in response to a received interruption (step 340); this step would occur after step 310 in FIG. 3A. In this example, it is assumed that at least one of the SSE flag and/or the TBE flag is set to indicate that a single-step trap mode or a taken-branch trap mode was active prior to the interruption handler being invoked and has been preserved after the interruption handler has been invoked in accordance with the processing shown in FIG. 3A. In other words, this example represents the default branch of the flowchart in FIG. 3A for trap mode conditioning field values other than "000" or "001". When either of those cases are in effect, then the interruption handler executes without interference from a trap handler, and FIG. 3C would not be applicable.

At some subsequent point in time, a single-step trap mode or a taken-branch trap mode is then detected at an appropriate point in time, such as the first instruction or the first branch-type instruction within the interruption handler (step 342). In one embodiment, the branch to the interruption handler is considered a taken-branch operation, and the taken-branch trap handler would be called prior to the execution of the first instruction of the interruption handler. In any case, the appropriate single-step trap handler or taken-branch trap handler is invoked (step 344), performs its processing (step 346), and then returns (step 348). FIG. 3D provides a more detailed explanation of the processing that occurs for step 346.

The interruption handler then continues its processing (step 350), which may be disrupted again by a single-step trap mode or a taken-branch trap mode as shown in steps 342-348. However, at some subsequent point in time, the interruption handler completes its processing and executes an RFI instruction (step 352), as was described above with respect to FIG. 3B.

Since the single-step trap mode or the taken-branch trap mode may be active after the execution of the RFI instruction, then one of these modes could be detected upon the execution of the RFI instruction (step 354). In response, the appropriate single-step trap handler or taken-branch trap handler is invoked (step 356). FIG. 3E provides a more detailed explanation of the processing that occurs in conjunction with step 356 in order to trace instructions that have been executed within an interruption handler.

With reference now to FIG. 3D, a flowchart depicts a series of steps within a trap handler that alters its operational behavior in accordance with the values that are stored within a trap mode conditioning field in a processor register. FIG. 3D shows more detail for step 346 of FIG. 3C. More specifically, the flowchart in FIG. 3D centers on the steps that are performed by a trap handler with respect to the contention that may be caused when an interruption is simultaneously being fielded by an interruption handler; various steps within the trap handler with respect to typical operations that might be performed when a single-step trap or taken-branch trap is triggered without a simultaneous interruption are not shown.

The process begins by entering a trap handler, such as a single-step trap handler or a taken-branch trap handler (step 362). A determination is made as to whether or not the processor is in a state in which an interruption is being processed (step 364), e.g., by checking one or more flags in the processor status register or the interruption status register. If an interruption is being processed, then the TMC field of the processor status register is checked against various binary values to determine which actions should be performed within the trap handler; depending on the implementation, alternative values could be used, and other processing modes could be configured.

The trap handler determines whether or not the TMC field has a binary value of "100" (step 366). If so, then the trap handler should continue to perform its typical single-step trap or taken-branch trap processing (step 368), even if an interruption handler has already been invoked, after which the portion of the process that is shown in the flowchart is complete. In this manner, the trap handler allows instruction tracing and other operations through the execution flow of the interruption handler, which may be helpful to a system analyst who is debugging or studying the interruption handler.

If the determination at step 364 is negative, then the trap handler determines whether or not the TMC field has a binary value of "101" (step 370). If so, then the trap handler clears the SSE and TBE flags (step 372), after which processing is complete for this mode. The trap handler returns execution control back to the interruption handler as quickly as possible, and by clearing the trap mode flags, the trap handler temporarily configures the processor so that the trap handler is not invoked again until after the interruption handler has completed its processing. As mentioned above, this option might be useful to a system analyst who is tracing only application code and is not interested in tracing any operations within the kernel, such as the interruption handler.

If the determination at step 370 is negative, then the trap handler determines whether or not the TMC field has a binary value of "110" (step 374). If so, the trap handler generates one or more trace records (step 376) and then clears the SSE and TBE flags at step 372, after which processing is complete for this mode. By generating a trace record when the trap handler is entered, the trap handler can provide an indication that the interruption handler was invoked; by clearing the trap mode flags, the trap handler temporarily configures the processor so that the trap handler is not invoked again until after the interruption handler has completed its processing.

If the determination at step 374 is negative, then the trap handler determines whether or not the TMC field has a binary value of "111" (step 378). If so, the trap handler saves information that it will need after the interruption state has been completed or cleared by the interruption handler (step 380) and then clears the SSE and TBE flags at step 372, after which processing is complete for this mode. By saving information about the current state of the processor, the trap handler uses the single invocation of the trap handler during the interruption state to save information that it will subsequently use upon the next invocation of the trap handler. By clearing the trap mode flags, the trap handler temporarily configures the processor so that the trap handler is not invoked again until after the interruption handler has completed its processing. When the trap handler is invoked again, it can use this saved information for various purposes, as explained below.

Referring again to step 364, if the processor is in a state in which an interruption is not being processed, then the trap handler determines whether or not the TMC field has a binary value of "111" (step 382). If not, then the trap handler should continue to perform its typical single-step trap or taken-branch trap processing at step 368. If the TMC field has a binary value of "111", then a determination is made as to whether or not the trap handler has previously saved interruption state information (step 384). If not, then the trap handler should continue to perform its typical single-step trap or taken-branch trap processing at step 368. If the trap handler has previously saved interruption state information, then the process continues as shown in FIG. 3E. During steps 382 and 384, the trap handler is determining whether or not the trap handler is being invoked after it has saved information during an interruption state and after the interruption state has been cleared; during the interruption state, the trap handler saved the information state information at step 380 in preparation for the processing that occurs within the flowchart shown in FIG. 3E. In this manner, the trap handler is able to configure itself during a first invocation and then complete its operation during a next invocation.

With reference now to FIG. 3E, a flowchart depicts a series of steps that are completed after the trap handler has determined that it is being invoked after an interruption state has been cleared and that it had saved interruption state information while the interruption state was active. In this example, the steps that are shown in FIG. 3E are performed after a saved interruption state is found to exist at step 384 in FIG. 3D; in other words, the trap handler is being entered at step 356 within the timeline shown in FIG. 3C.

FIG. 3D was described in a generic manner; step 380 saved interruption state information, but no particular purpose for this step is mandated by the process shown in FIG. 3D. A system analyst could configure the trap handler to perform a wide variety of steps for the process shown in FIG. 3E. In other words, the trap handler has been conditioned to be invoked at least once during the interruption state and to save state information, but many different operations could be performed with respect to this saved state information.

The example shown in FIG. 3E describes a process for tracing instructions within the interruption handler. This process could be embodied within the trap handler, or this process could be embodied within a tracing program or tracing driver that has registered with the trap handler in some manner, thereby isolating this process from the otherwise generic processing of the trap handler. Similarly, step 380 could include a call to a routine that provides its own functionality for saving state information; for example, a routine in the tracing software could be invoked to save whatever information that it might require for tracing instructions in the interruption handler.

Continuing with the example of tracing instructions within the interruption handler, at step 380 in FIG. 3D, an information saving routine in the instruction tracing software could obtain and save the current instruction count; the current instruction count is preferably obtained just before returning execution control from the trap handler to the interruption handler so that the instruction count subsequently reflects almost exclusively only instructions outside of the instruction tracing software and the trap handler. It may be assumed that the performance monitor within the processor has been previously configured so that one of the performance monitor counter (PMC) registers counts the number of executed instructions. The routine in the instruction tracing software then returns execution control to the trap handler, which subsequently performs the action at step 372 and returns (shown as step 348 in FIG. 3C); in this example, the processing returns to step 350 in FIG. 3C. The instruction tracing software has merely configured itself for further processing without actually tracing any instructions at that point. The actual tracing of instructions is shown in more detail below with respect to FIG. 3E.

The process begins by retrieving the state information that was saved during a previous invocation of the instruction tracing software (step 385). The previously saved PMC value within the saved state information is then retrieved (step 386), and the current value of the appropriate PMC register is also retrieved (step 387). The difference between the PMC values is computed (step 388); the difference represents the number of instructions that were executed between the invocations of the instruction tracing software, although the number may need to be adjusted for the instructions that were executed within the instruction tracing software itself or within the trap handler itself (step 389). Preferably, the current value of the PMC register that contains the number of executed instructions would be read immediately upon entry to the trap handler at step 362 and then saved in case the execution flow reached step 389.

The address associated with the instruction that caused the trap handler to be invoked is then obtained (step 390). Using the computed number of executed instructions and the obtained address, the instruction tracing software can obtain copies of those previously executed instructions (step 391). These copies of the instructions are then written to the trace output buffer (step 392), and the process is complete.

The address from which to retrieve instructions may be obtained in a variety of ways. Assuming that the interruption handler has executed an RFI instruction, which is a branch-type instruction, then the processor has restored the single-step trap mode or the taken-branch mode if they were disabled, and the RFI instruction triggers either the single-step trap handler or the taken-branch mode handler, which may be the same piece of software or may be separate pieces of software. The processor would also contain a register with the address of the instruction that caused the branch, i.e., the branch-from address. If the branch-type instruction was the RFI instruction at the end of the interruption handler, then the branch-from address points to the last instruction of the interruption handler. The instruction tracing software can obtain the appropriate number of instructions within the interruption handler using the computed number of executed instructions, i.e., the block of instructions immediately preceding the RFI instruction.

If a non-branch-type instruction was executed, then it can be assumed that the trap handler was entered due to a single-step mode being active, and the address of the instruction that caused the trap may be obtained from an appropriate register, such as the instruction pointer (or its equivalent saved value, e.g., an interruption instruction pointer, since the trap handler has been invoked and the current instruction pointer may point to an instruction within the trap handler or instruction tracing routine).

The advantages of the present invention should be apparent in view of the detailed description of the invention that is provided above. In the prior art, when an interruption is received, a processor always clears the flags associated with a single-step trap mode or a taken-branch trap mode so that the interruption handler could proceed freely without interruption from the single-step trap handler or the taken-branch trap handler. In the present invention, the operation of the flags associated with a single-step trap mode or a taken-branch trap mode are conditioned with other flags that indicate whether or not to preserve those modes during interruption processing. The use of these trap-conditioning flags allow an interruption handler to run at full speed without being interrupted by a single-step trap mode or a taken-branch trap mode, yet the single-step trap mode and/or the taken-branch trap mode are preserved so that other processing, such as instruction tracing, may continue without additional software-level interference to ensure the preservation of these modes.

These trap-conditioning flags may be used without performing instruction tracing. However, when used in conjunction with instruction tracing, in order to obtain the most accurate instruction trace information for the instructions within the interruption handler in the most efficient manner, the single-step trap mode would most likely be cleared upon receipt of an interruption, but the taken-branch trap mode would probably be maintained. After each branch-type instruction within the interruption handler is executed, the instruction tracing software would then be invoked, thereby allowing the interruption handler to execute rather freely while still allowing the instruction tracing software to perform its functions.

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include storage media such as, EPROM, ROM, tape, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A processor that performs operations specified by instructions fetched from a memory, the processor comprising:
    means for maintaining a plurality of register fields for indicating one or more conditions, statuses, and/or modes that are present within the processor;
    means for fetching instructions from memory;
    means for executing an instruction within the processor;
    means for receiving a plurality of types of interruptions;
    means for indicating whether the trap mode is active or inactive using a trap mode field within the processor, wherein a first trap mode field indicates that a single-step trap mode is active and wherein a second trap mode field indicates that a taken-branch trap mode is active;
    means for determining whether a trap mode is to remain active during interruption processing in response to receiving an interruption;
    means for deactivating a trap mode in response to a determination that the trap mode is to be deactivated during interruption processing; and
means for invoking an interruption handler to perform interruption processing for a received interruption.

2. The processor of claim 1 further comprising:
    means for maintaining a trap mode conditioning field within the processor to indicate whether a trap mode is to remain active during interruption processing.

3. The processor of claim 2 wherein a first trap mode conditioning field conditions activity of a single-step trap mode.

4. The processor of claim 2 wherein a second trap mode conditioning field conditions activity of a taken-branch trap mode.

5. The processor of claim 1 further comprising:
    means for performing a trace operation prior to deactivating the trap mode.

6. The processor of claim 1 further comprising:
    means for reactivating the trap mode after interruption processing.

7. The processor of claim 6 further comprising:
    means for performing a trace operation after reactivating the trap mode.

8. A computer program product in a computer-readable storage medium for use in a data processing system for processing an instruction within a processor, wherein the processor processes a plurality of types of interruptions, and wherein the processor comprises a plurality of register fields for indicating one or more conditions, statuses, and/or modes that are active within the processor, the computer program product comprising:
    means for executing an instruction within the processor;
    means for receiving an interruption signal by the processor;
    means for indicating whether the trap mode is active or inactive using a trap mode field within the processor, wherein a first trap mode field indicates that a single-step trap mode is active and wherein a second trap mode field indicates that a taken-branch trap mode is active;
    means for determining whether a trap mode is to remain active during interruption processing in response to receiving the interruption signal;
    means for deactivating the trap mode in response to a determination that the trap mode is to be deactivated during interruption processing; and
means for invoking an interruption handler to perform interruption processing for the received interruption signal.

9. The computer program product of claim 8 further comprising:
    means for indicating whether a trap mode is to remain active during interruption processing using a trap mode conditioning field within the processor.

10. The computer program product of claim 9 wherein a first trap mode conditioning field conditions activity of a single-step trap mode.

11. The computer program product of claim 9 wherein a second trap mode conditioning field conditions activity of a taken-branch trap mode.

12. The computer program product of claim 8 further comprising:
    means for performing a trace operation prior to deactivating the trap mode.

13. The computer program product of claim 8 further comprising:
    means for reactivating the trap mode after interruption processing.

14. The computer program product of claim 13 further comprising:
    means for performing a trace operation after reactivating the trap mode.

* * * * *